US012072976B1

(12) United States Patent
Kats

(10) Patent No.: US 12,072,976 B1
(45) Date of Patent: Aug. 27, 2024

(54) SYSTEMS AND METHODS FOR UTILIZING TELEMETRY DATA TO CUSTOMIZE THREAT PROTECTION ACTIONS AGAINST POTENTIAL MALWARE THREATS

(71) Applicant: GEN DIGITAL INC., Tempe, AZ (US)

(72) Inventor: Daniel Kats, Culver City, CA (US)

(73) Assignee: GEN DIGITAL INC., Tempe, AZ (US)

( * ) Notice: Subject to any disclaimer, the term of this patent is extended or adjusted under 35 U.S.C. 154(b) by 366 days.

(21) Appl. No.: 17/510,967

(22) Filed: Oct. 26, 2021

(51) Int. Cl.
*G06F 21/00* (2013.01)
*G06F 21/54* (2013.01)
*G06F 21/56* (2013.01)

(52) U.S. Cl.
CPC .......... *G06F 21/561* (2013.01); *G06F 21/54* (2013.01); *G06F 2221/033* (2013.01)

(58) Field of Classification Search
None
See application file for complete search history.

(56) References Cited

U.S. PATENT DOCUMENTS

| | | |
|---|---|---|
| 7,841,008 B1 | 11/2010 | Cole et al. |
| 9,401,925 B1 | 7/2016 | Guo et al. |
| 9,794,290 B2 | 10/2017 | Mital et al. |
| 9,798,876 B1 | 10/2017 | Parker-Wood et al. |
| 10,003,606 B2 | 6/2018 | Roundy et al. |
| 10,057,274 B1 | 8/2018 | Roundy et al. |
| 10,574,702 B1 * | 2/2020 | Rickerd .................. H04L 63/20 |
| 11,075,933 B1 * | 7/2021 | Fetters ................... H04W 12/64 |
| 11,328,059 B2 * | 5/2022 | Rudnik .................. G06F 21/567 |
| 11,848,106 B1 * | 12/2023 | Wood ...................... G16H 50/30 |
| 11,902,306 B1 * | 2/2024 | Satish ................. H04L 63/1441 |
| 2014/0143869 A1 * | 5/2014 | Pereira .................. G06F 21/564<br>726/23 |
| 2014/0283069 A1 * | 9/2014 | Call ..................... H04L 63/1483<br>726/23 |
| 2015/0172300 A1 * | 6/2015 | Cochenour ......... G06F 21/6218<br>726/23 |
| 2015/0172311 A1 * | 6/2015 | Freedman ............... H04L 63/20<br>726/1 |

(Continued)

OTHER PUBLICATIONS

Sun, Nan et al. Data-Driven Cybersecurity Incident Prediction: A Survey. IEEE Communications Surveys & Tutorials, vol. 21, Issue: 2. https://ieeexplore.IEEE.org/stamp/stamp.jsp?tp=&arnumber=8567980 (Year: 2019).*

(Continued)

*Primary Examiner* — Jeremiah L Avery
(74) *Attorney, Agent, or Firm* — Greenberg Traurig, LLP

(57) ABSTRACT

The disclosed computer-implemented method for utilizing telemetry data to customize threat protection actions against potential malware threats may include (i) detecting telemetry data on a group of client devices, (ii) determine customer type data and threat type data for the client devices based on the telemetry data, (iii) group the client devices into one or more threat clusters based on the customer type data and the threat type data, and (iv) perform a security action that protects against potential malware threats associated with each of the threat clusters. Various other methods, systems, and computer-readable media are also disclosed.

20 Claims, 8 Drawing Sheets

(56) References Cited

U.S. PATENT DOCUMENTS

| | | | |
|---|---|---|---|
| 2016/0044054 A1* | 2/2016 | Stiansen | H04L 63/1416 |
| | | | 726/24 |
| 2017/0223046 A1* | 8/2017 | Singh | H04L 63/1491 |
| 2017/0289191 A1* | 10/2017 | Thioux | H04L 63/1441 |
| 2018/0183766 A1* | 6/2018 | Crabtree | H04L 63/0815 |
| 2018/0198821 A1* | 7/2018 | Gopalakrishna | G06F 21/566 |
| 2018/0219894 A1* | 8/2018 | Crabtree | H04L 63/20 |
| 2018/0295154 A1* | 10/2018 | Crabtree | H04L 63/1433 |
| 2020/0034538 A1* | 1/2020 | Woodward | G06F 12/0842 |
| 2020/0314126 A1* | 10/2020 | Schmugar | H04W 12/12 |
| 2020/0327222 A1* | 10/2020 | Chhabra | H04L 63/0421 |
| 2020/0358804 A1* | 11/2020 | Crabtree | H04L 63/1433 |
| 2021/0021644 A1* | 1/2021 | Crabtree | G06F 16/951 |
| 2021/0216630 A1* | 7/2021 | Karr | H04L 63/1416 |
| 2021/0258329 A1* | 8/2021 | Clayton | H04L 63/0876 |
| 2021/0281609 A1* | 9/2021 | Crabtree | H04L 63/1425 |
| 2021/0297443 A1* | 9/2021 | Crabtree | G06F 16/2474 |
| 2021/0297447 A1* | 9/2021 | Crabtree | H04L 63/1416 |
| 2021/0360032 A1* | 11/2021 | Crabtree | G06F 16/2477 |
| 2022/0014561 A1* | 1/2022 | Caceres | G06F 16/951 |
| 2022/0060453 A1* | 2/2022 | Crabtree | H04L 63/08 |
| 2022/0078210 A1* | 3/2022 | Crabtree | G06F 16/9024 |
| 2022/0224723 A1* | 7/2022 | Crabtree | H04L 63/20 |

OTHER PUBLICATIONS

Levsque, Fanny Lalonde et al. Risk prediction of malware victimization based on user behavior. 2014 9th International Conference on Malicious and Unwanted Software: The Americas (MALWARE). https://ieeexplore.IEEE.org/stamp/stamp.jsp?tp=&arnumber= 6999412 (Year: 2014).*

Leitold, Ferenc et al. Measuring the information security risk in an infrastructure. 2015 10th International Conference on Malicious and Unwanted Software (MALWARE). https://ieeexplore.IEEE.org/stamp/stamp.jsp?tp=&arnumber=7413689 (Year: 2015).*

* cited by examiner

SYSTEMS AND METHODS FOR UTILIZING TELEMETRY DATA TO CUSTOMIZE THREAT PROTECTION ACTIONS AGAINST POTENTIAL MALWARE THREATS

BACKGROUND

Users of application software and web browsers over computing networks are often exposed to different threats (or varied risks from the same threats) that may compromise the security of computing devices during the performance of various tasks in both consumer and enterprise environments. For example, consumer users visiting high risk websites to view a streaming video program (e.g., streaming video of pirated media content) may be exposed to different security threats and/or risks than an enterprise user working at a financial institution or a software developer utilizing various network tools to write code for an enterprise software product or service.

Traditional methods for addressing security threats on computing devices include utilizing software tools (e.g., anti-virus software) that execute as a non-interactive background process to detect and prevent a wide range of potential threats (e.g., malware threats) for a broad population of users. However, the "one-size-fits-all" approach performed by these traditional methods may often result in implementing protection actions that are too strong for some groups of computing device users (e.g., software developers) while being too weak for other groups of computing device users (e.g., watchers of pirated video streams), resulting in a less than ideal security posture for both user groups.

SUMMARY

As will be described in greater detail below, the present disclosure describes various systems and methods for utilizing telemetry data to customize threat protection actions against potential malware threats.

In one example, a method for utilizing telemetry data to customize threat protection actions against potential malware threats may include (i) detecting, by one or more computing devices, the telemetry data on a group of client devices, (ii) determining, by the one or more computing devices, customer type data and threat type data for the client devices based on the telemetry data, (iii) grouping, by the one or more computing devices, the client devices into one or more threat clusters based on the customer type data and the threat type data, and (iv) performing, by the one or more computing devices, a security action that protects against potential malware threats associated with each of the threat clusters.

In some embodiments, the security action may include providing one or more recommendations associated with each of the threat clusters to protect against the potential malware threats. For example, the recommendations may include updating programmatic settings in a threat protection application executing on the client devices (e.g., increasing the sensitivity of ransomware detection, adopting a stricter posture for unknown websites or downloads, etc.) and/or presenting (e.g., to a user of a client device) one or more interventions associated with mitigating the potential malware threats for implementation, such as disabling macros in productivity application software, enabling non-default operating system security settings, installing a secure web browser extension, installing a firewall application, etc.

In some examples, the security action may additionally include (i) monitoring the client devices to detect one or more implementations of the recommendations, determining an effectiveness of each of the implemented recommendations against the potential malware threats, (iii) ranking each of the implemented recommendations based on the effectiveness against the potential malware threats, and (iv) updating a recommendations list to include only the highest ranked implemented recommendations. In some embodiments, the highest ranked implemented recommendations may include an intervention that is effective in mitigating at least one of the potential malware threats by a statistically significant amount.

In some examples, the telemetry data may include one or more applications installed on the client devices and one or more websites accessed (e.g., visited from a web browser) from the client devices. In some embodiments, the customer type data and the threat type data may be determined by (i) identifying, based on the telemetry data, one or more predefined customer profiles for each of a set of user groups associated with the client devices to determine the customer type data and (ii) assigning, based on the telemetry data, a malware threat classification for each of a set of client device groups within the client devices to determine the threat type data. In some examples, the predefined customer profiles may be identified by (i) retrieving installation data describing installed applications from the client devices, (ii) retrieving website data describing visited websites from the client devices, and (iii) training a machine learning model, utilizing the installation data and the website data, to associate the client devices with cluster labels describing the predefined customer profiles for the set of user groups. In some examples, the client devices may be grouped into threat clusters by assigning them into different sub-groups based on one or more predominant potential malware threats associated with installed applications on the client devices and websites visited from the client devices.

In one embodiment, a system for utilizing telemetry data to customize threat protection actions against potential malware threats may include at least one physical processor and physical memory that includes computer-executable instructions and one or more modules that, when executed by the physical processor, cause the physical processor to (i) detect, by a detection module, the telemetry data on a group of client devices, (ii) determine, by a determining module, customer type data and threat type data for the client devices based on the telemetry data, (iii) group, by a cluster module, the client devices into one or more threat clusters based on the customer type data and the threat type data, and (iv) perform, by a security module, a security action that protects against potential malware threats associated with each of the threat clusters.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect telemetry data on a group of client devices, (ii) determine customer type data and threat type data for the client devices based on the telemetry data, (iii) group the client devices into one or more threat clusters based on the customer type data and the threat type data, and (iv) perform a security action that protects against potential malware threats associated with each of the threat clusters.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
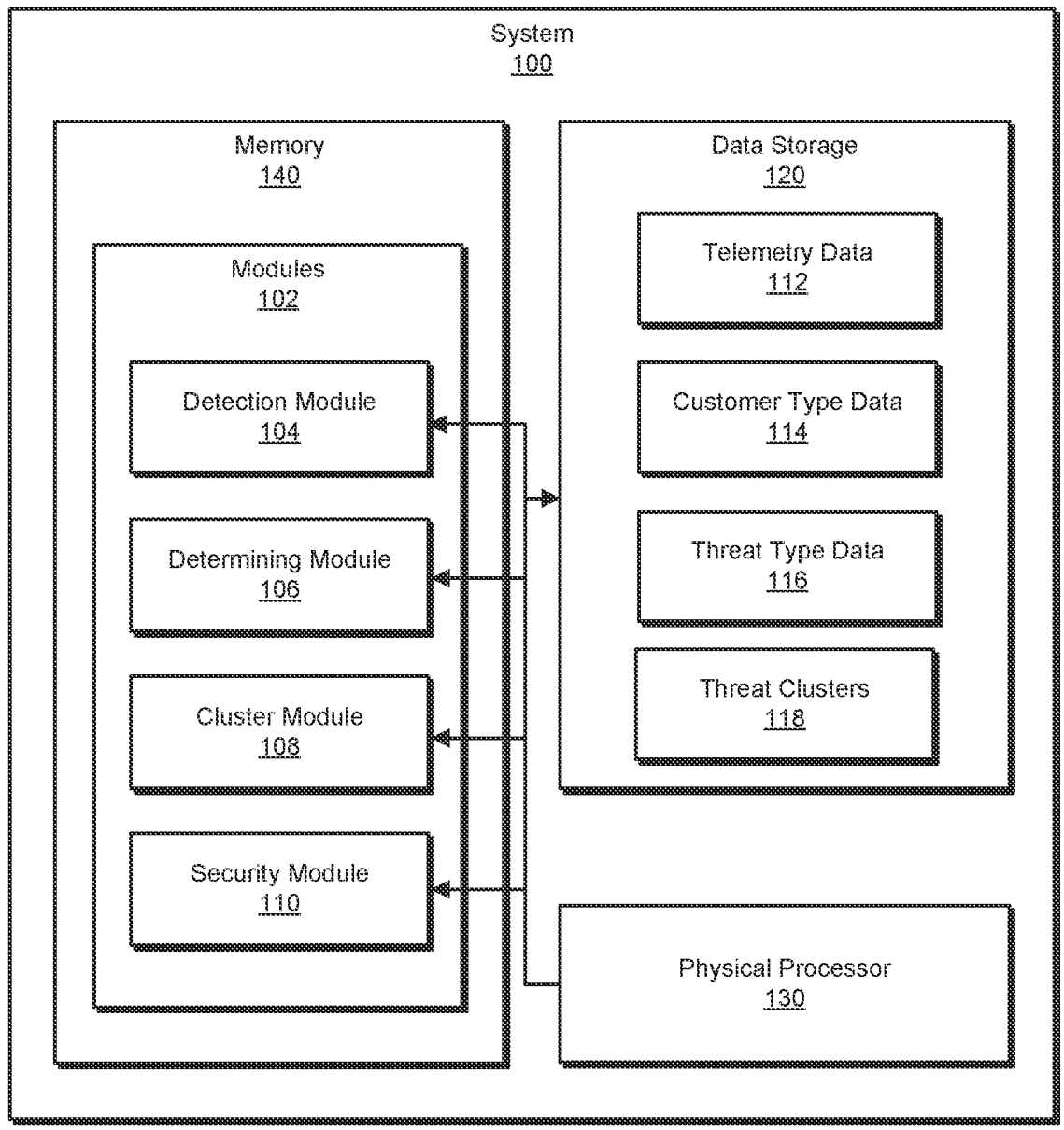
FIG. 1 is a block diagram of an example system for utilizing telemetry data to customize threat protection actions against potential malware threats.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for utilizing telemetry data to customize threat protection actions against potential malware threats. As will be described in greater detail below, the systems and methods described herein may utilize existing telemetry (e.g., installed software and visited websites) detected on multiple groups of computing devices to identify common threats associated with multiple users or customers and then group the customers into specific clusters based on customer types (e.g., suggested pre-defined profiles such as "gamer," "streamer," "developer," "IT professional," "productivity software user," etc.) and threat types (e.g., malicious document attachments and websites, phishing, ransomware, web browser vulnerabilities, etc.). By utilizing the aforementioned telemetry to group customers into clusters in this way, the systems and methods described herein may provide specific recommendations of implementable interventions (according to the most prevalent threats affecting each group) to customer computing devices for preventing potential malware attacks. Moreover, the systems and methods described herein may further utilize the telemetry to determine the effectiveness of each recommended intervention provided to the clusters over time so that the promotion of future recommendations may be "tuned" to only the most statistically significant interventions.

In addition, the systems and methods described herein may improve the field of computing device security by providing custom threat protection solutions (in the form of recommended interventions) based on the most prevalent threats affecting specific user groups. As a result, the mitigation of malware threats for these groups may be improved by only providing the most effective threat protection actions and by eliminating any ineffective actions as determined by customer acceptance and threat reduction analysis.

Figure 2:
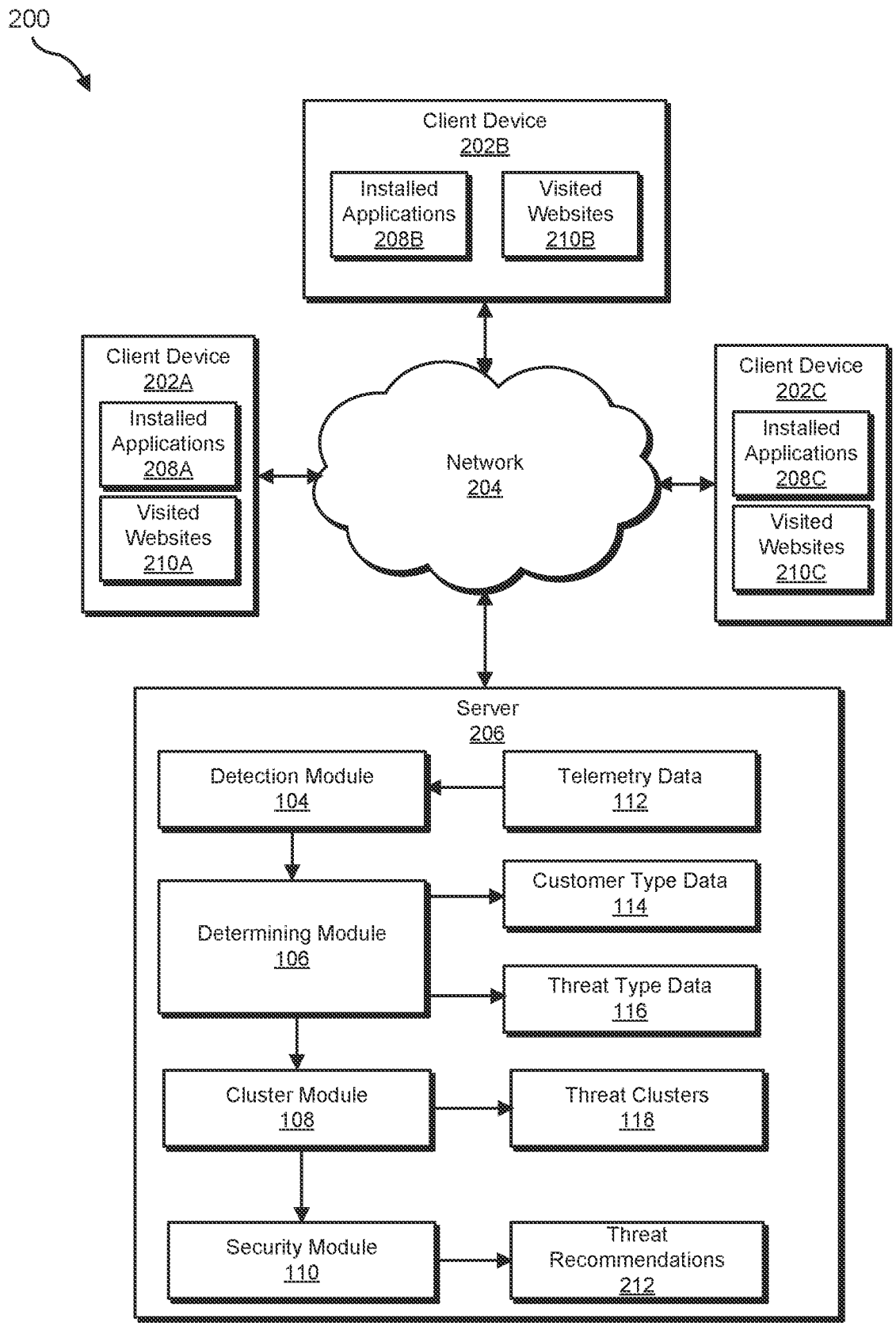
FIG. 2 is a block diagram of an additional example system for utilizing telemetry data to customize threat protection actions against potential malware threats.

The following will provide, with reference to FIGS. 1-2, detailed descriptions of example systems for utilizing telemetry data to customize threat protection actions against potential malware threats. Detailed descriptions of corresponding computer-implemented methods will also be provided in connection with FIGS. 3 and 6. A detailed description of example telemetry data that may be utilized in the example systems of FIGS. 1 and 2, will also be provided in connection with FIG. 4. A detailed description of an example machine learning model that may be utilized in the example systems of FIGS. 1 and 2, will also be provided in connection with FIG. 5. In addition, detailed descriptions of an example computing system and network architecture capable of implementing one or more of the embodiments described herein will be provided in connection with FIGS. 7 and 8, respectively.

FIG. 1 is a block diagram of an example system 100 for utilizing telemetry data to customize threat protection actions against potential malware threats. As illustrated in this figure, example system 100 may include one or more modules 102 for performing one or more tasks. For example, and as will be explained in greater detail below, example system 100 may include a detection module 104 that detects telemetry data 112 on a group of client devices. Example system 100 may additionally include a determining module 106 that determines customer type data 114 and threat type data 116 for the client devices based on telemetry data 112. Example system 100 may also include a cluster module 108 that groups the client devices into threat clusters 118 based on customer type data 114 and threat type data 116. Example system 100 may additionally include a security module 110 that performs a security action that protects against potential malware threats associated with each of threat clusters 118. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing telemetry data to customize threat protection actions against potential malware threats. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store telemetry data 112, customer type data 114, threat type data 116, and threat clusters 118.

Example system 100 in FIG. 1 may be implemented in a variety of ways. For example, all or a portion of example system 100 may represent portions of example system 200 in FIG. 2. As shown in FIG. 2, system 200 may include client devices 202A, 202B, and 202C in communication with a server 206 via a network 204. In one example, all or a portion of the functionality of modules 102 may be performed by client devices 202A-202C, server 206, and/or any other suitable computing system. As will be described in greater detail below, one or more of modules 102 from FIG. 1 may, when executed by at least one processor of server 206, enable server 206 to utilize telemetry data to customize threat protection actions against potential malware threats.

For example, detection module 104 may detect telemetry data 112 on client devices 202A-202C. Next, determining module 106 may determine customer type data 114 and threat type data 116 for client devices 202A-202C based on telemetry data 112. For example, and as will be described in greater detail below, telemetry data 112 for client device 202A may include installed applications 208A and visited websites 210A, telemetry data 112 for client device 202B may include installed applications 208B and visited websites 210B, and telemetry data 112 for client device 202C may include installed applications 208C and visited websites 210C. Then, cluster module 108 may group client devices 202A-202C into threat clusters 118 based on customer type data 114 and threat type data 116. Finally, security module 110 may perform a security action (i.e., provide threat recommendations 212) that protects against potential malware threats associated with threat clusters 118.

Client devices 202A-202C generally represent any type or form of computing device capable of reading computer-executable instructions. In some examples, client devices 202A-202C may be endpoint devices running client-side security software for detecting and mitigating malicious attacks. Additional examples of client devices 202A-202C include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading and/or executing computer-readable instructions. In some examples, server 206 may be a security server running server-side security software for detecting and mitigating malicious attacks. Additional examples of server 206 include, without limitation, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between client devices 202A-202C and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
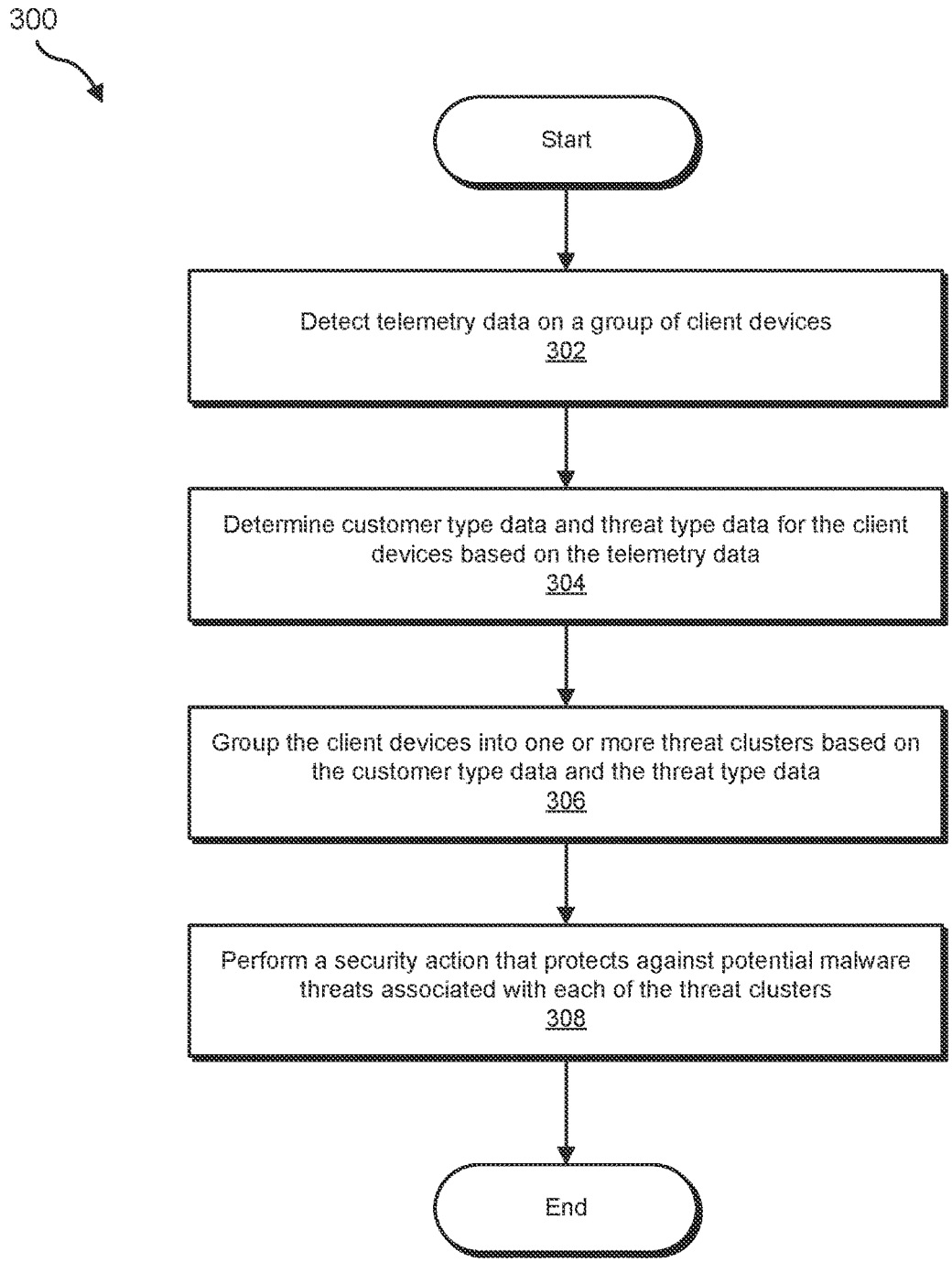
FIG. 3 is a flow diagram of an example method for utilizing telemetry data to customize threat protection actions against potential malware threats.

FIG. 3 is a flow diagram of an example computer-implemented method 300 for utilizing telemetry data to customize threat protection actions against potential malware threats. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect telemetry data on a group of client devices. For example, detection module 104 may, as part of server 206 in FIG. 2, detect telemetry data 112 on each of client devices 202A-202C.

Detection module 104 may detect telemetry data 112 in a variety of ways. In some examples, detection module 104 may detect telemetry data 112 by retrieving a list of installed applications 208A-208C and visited websites 210A-210C from client devices 202A-202C. In some embodiments, telemetry data 112 may be retrieved from client devices 202A-202C as pseudonymous data (i.e., data that excludes personal data that may be utilized to identify specific users associated with installed applications 208A-208C and visited websites 210A-210C). In one embodiment, a list of installed applications 208A-208C may be retrieved by accessing log data generated by a file reputation service implemented by a threat protection application executing on client devices 202A-202C. For example, the file reputation service may be configured to check the reputation of all files installed on client devices 202A-202C against a cloud server-based reputation database for potential malware threats and create a log file of the checked installed applications. Additionally, in one embodiment, a list of visited websites 210A-210C may be retrieved by accessing website reputation data generated by a web reputation service implemented by the threat protection application executing on client devices 202A-202C. For example, the web reputation service may be configured to track user web browsing activity on client devices 202A-202C to identify web domains for comparing to a domain-reputation database utilized for detecting potential web threats (e.g., malware, spyware, phishing scams, etc.). In some examples, (i.e., when a dataset for a number of visited websites may be extremely large), visited websites 210A-210C may be a list of website categories together along with a count of a number of accesses to websites in each category, over a predetermined period (e.g., 60 days) such as "education: 10," "entertainment: 100," "news and information: 5," "adult: 200," etc.

At step 304 one or more of the systems described herein may determine customer type data and threat type data for the client devices based on the telemetry data detected at step 302. For example, determining module 104 may, as part of server 206 in FIG. 2, determine customer type data 114 and threat type data 116 for client devices 202A-202C based on telemetry data 112.

The term "customer type data" or "customer type," as used herein, generally refers to data identifying any number of pre-defined personas or profiles based on installed applications 208A-208C and visited websites 210A-210C on client devices 202A-202C. For example, a gamer profile may be assigned to a user client device where multiple online gaming applications are installed, and the user website history includes multiple gaming websites. Example customer type profiles may include, without limitation, "gamer," "streamer," "developer," "IT professional," "office productivity application user" (e.g., accountant, lawyer, banker, etc.), "doctor/hospital user," "casual browser/emailer," etc. In some examples, a customer type may include a combination of profiles (e.g., 40% gamer, 30% developer, 30% news addict).

Figure 4:
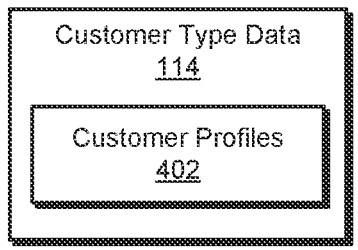
FIG. 4 is a block diagram of example telemetry data that may be utilized in the example systems of FIGS. 1 and 2.
Figure 4:
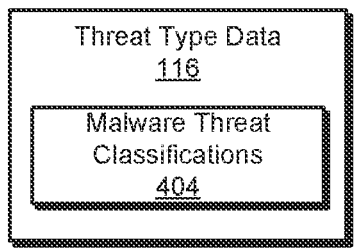

The term "threat type data" or "threat type," as used herein, generally refers to any number of threat classifications (e.g., malware threat classifications, such as malware threat classifications 404 shown in FIG. 4) and/or threat taxonomy describing one or more actions that may be executed by malicious code on a computing device to compromise security. In some examples, the threat classifications may correspond to actions catalogued in a cybersecurity knowledge base of adversary tactics and techniques based on real-world observations, such as the MITRE ATT&CK framework developed by the MITRE CORPORATION of Bedford, Massachusetts and Mclean, Virginia. For example, a 'Reconnaissance" MITRE threat classification may include the following techniques (i.e., actions): "Active Scanning," "Gather Victim Host, Identity, Network, or Organization Information," "Phishing for Information," and "Search Closed Sources, Open Technical Databases, Open Websites/Domains, or Victim-Owned Websites."

Determining module 106 may determine customer type data 114 and threat type data 116 in a variety of ways. In some examples, determining module 106 may determine customer type data 114 by identifying, based on telemetry data 112, one or more predefined customer profiles (such as customer profiles 402 shown in FIG. 4) for each of a set of user groups associated with client devices 202A-202C. In one embodiment, customer profiles 402 may be identified by (i) retrieving installation data describing installed applications 208A-208C from client devices 202A-202C, (ii) retrieving website data describing visited websites 210A-210C from client devices 202A-202C, and (iii) training a machine learning model, utilizing the installation data and the website data, to associate client devices 202A-202C with cluster labels describing customer profiles 402 (e.g., "gamer," "streamer," "developer," "IT professional," "office productivity application user" (e.g., accountant, lawyer, banker, etc.), "doctor/hospital user," casual browser/emailer," etc.) for the set of user groups. In some embodiments, determining module 106 may determine threat type data 116 by identifying, based on telemetry data 112, malware threat classifications 404 (e.g., threat classifications corresponding to actions catalogued in a cybersecurity knowledge base of adversary tactics and techniques based on real-world observations).

Figure 5:
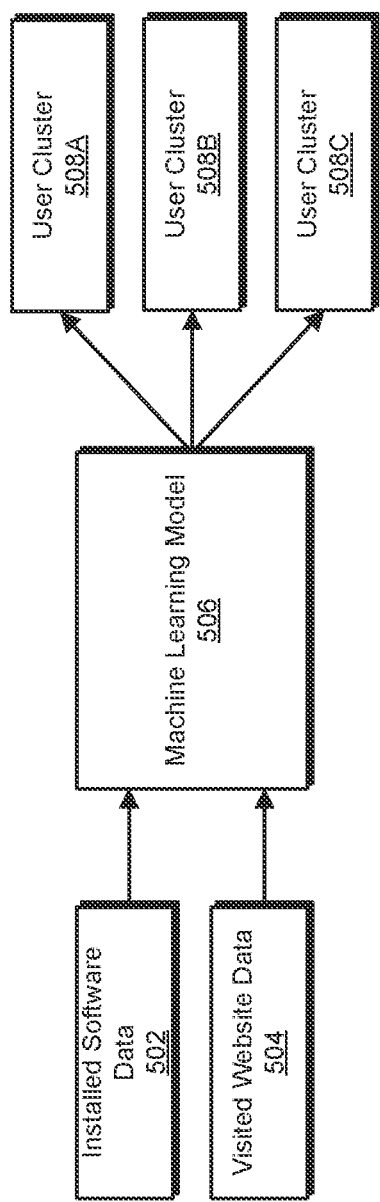
FIG. 5 is a block diagram of an example machine learning model that may be utilized in the example systems of FIGS. 1 and 2.

In one example, and as shown in FIG. 5, a machine learning model 506 may receive, as inputs, installation data (i.e., installed software data 502) and website data (i.e., visited website data 504) to output user clusters 508A, 508B, and 508C corresponding to different customer profiles and specific threats associated with these profiles (e.g., a "gamer" profile and potential malware threats that are prevalent in online gaming). In some examples, machine learning model 506 may be trained by utilizing one hot encoding (i.e., a process by which categorical variables are converted into a form that may be provided to machine learning algorithms to improve prediction) to express installed software (i.e., installed software data 502 as a one hot encoded vector and visited website data (i.e., visited website data 504) as a vector over categories with each entry corresponding to counts. Then, for each combination of websites and installed software, cluster labels corresponding to customer profiles 402 (described above) may be applied. Next, a machine learning algorithm (e.g., a k-nearest neighbors (KNN) or similar unsupervised algorithm) may be utilized to cluster multiple points associated with the cluster labels into user clusters 508A, 508B, and 508C. In some embodiments, machine learning model 506 may be continually refined (e.g., by a user) by manually labelling points that may appear between user clusters 508A-508C or, alternatively, by adding new cluster labels. In some embodiments, a linear discriminant analysis (LDA) or other mixture model may be utilized to capture a user's relationship to different clusters (e.g., 40% gamer, 30% developer, 30% news addict).

Returning now to FIG. 3, at step 306 one or more of the systems described herein may group the client devices into one or more threat clusters based on the customer type data and the threat type data. For example, cluster module 108 may, as part of server 206 in FIG. 2, group client devices 202A-202C into threat clusters 118.

Cluster module 108 may group client devices 202A-202C into threat clusters 118 in a variety of ways. In some examples, cluster module 108 may assign client devices 202A-202C different sub-groups (e.g., one or more of user clusters 508A-508C) based on one or more predominant potential malware threats associated with installed applications 208A-208C and visited websites 210A-210C. For example, if installed applications 208A and visited websites 210A on client device 202A are associated with a "gamer" customer type and user cluster 508A has a "gamer" cluster label, then client device 202A may be assigned to user cluster 508A. Similarly, if installed applications 208B and visited websites 210B on client device 202B are associated with a "streamer" customer type and user cluster 508B has a "streamer" cluster label, then client device 202B may be assigned to user cluster 508B. Additionally, if installed applications 208C and visited websites 210C on client device 202C are associated with a "developer" customer type and user cluster 508C has a "developer" cluster label, then client device 202C may be assigned to user cluster 508C. Alternatively, if any of installed applications 208A-208C and visited websites 210A-210C are associated with a mix of customer types (e.g., 40% "news addict," 30% "developer," and 30% "gamer"), then any associated client devices 202A-202C may be associated with a combination of user clusters 508A-508C.

At step 308 one or more of the systems described herein may perform a security action that protects against potential malware threats associated with each of the threat clusters. For example, security module 110 may, as part of server 206 in FIG. 2, perform a security action that includes generating one or more threat recommendations 212 that protect client devices 202A-202C against the most prevalent potential malware threats associated with each of threat clusters 118.

Security module 110 may perform the security action in a variety of ways. In some embodiments, security module 110 may generate threat recommendations 212 that include updating programmatic settings in a threat protection application executing on client devices 202A-202C based on a threat cluster 118. For example, if client device 202A is grouped into a threat cluster 118 associated with a productivity application worker (e.g., a banker), then security module 110 may automatically (or suggest that a user) increase the sensitivity of ransomware detection settings within the threat protection application and/or update settings to adopt a stricter posture for unknown websites or downloads. Additionally or alternatively, security module 110 may generate threat recommendations 212 that include interventions suggested to a user of client devices 202A-202C based on a threat cluster 118. For example, if client device 202B is grouped into a threat cluster 118 associated with a casual browser/emailer, then security module 110 may suggest (e.g., via a generated user interface dialog box) that a user install a browser extension to enhance web browser security and/or install a customer firewall application. As another example, suggested interventions may include (e.g., for a threat cluster 118 associated with productivity application workers) disabling macros in productivity application software and/or enabling one or more non-default operating system (OS) settings. In some embodiments, security module 110 may be configured to push threat clusters 118 and threat recommendations 212 locally to client devices 202A-202C for matching and for presenting interventions to users and/or the implementation of programmatic settings.

In some embodiments, security module 110 may also be configured to monitor whether users acted on each presented intervention. For example, and as will now be described with respect to FIG. 6, a flow diagram of an example computer-implemented method 600 is shown for utilizing telemetry data to customize threat protection actions against potential malware threats. The steps shown in FIG. 6 may be performed by any suitable computer-executable code and/or computing system, including system 100 in FIG. 1, system 200 in FIG. 2, and/or variations or combinations of one or more of the same. In one example, each of the steps shown in FIG. 6 may represent an algorithm whose structure includes and/or is represented by multiple sub-steps, examples of which will be provided in greater detail below.

Figure 6:
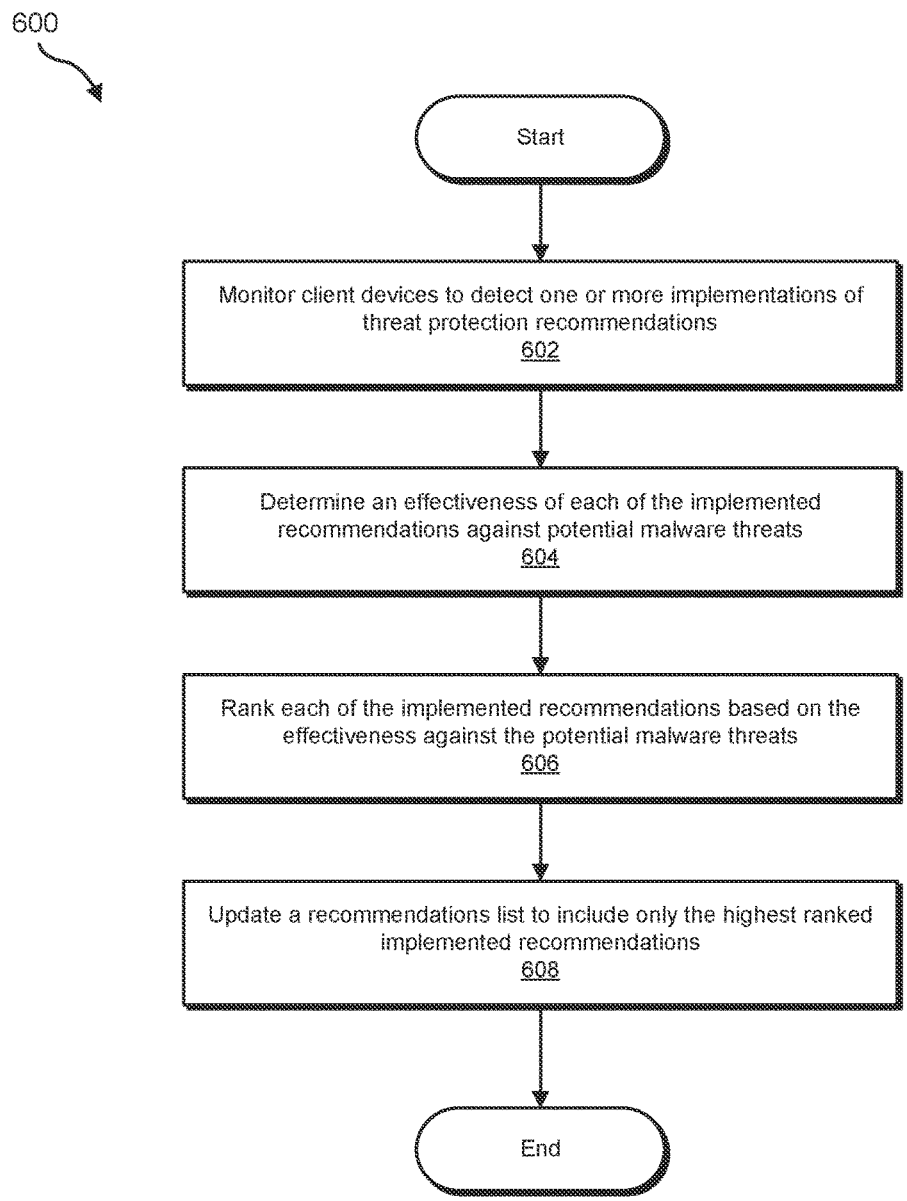
FIG. 6 is a flow diagram of an additional example method for utilizing telemetry data to customize threat protection actions against potential malware threats.

As illustrated in FIG. 6, at step 602 one or more of the systems described herein may monitor client devices to detect one or more implementations of threat protection recommendations. For example, security module 110 may, as part of server 206 in FIG. 2, monitor client devices 202A-202C to detect implementations of threat recommendations 212.

Security module 110 may monitor client devices 202A-202C for implementations of threat recommendations 212 in a variety of ways. In some examples, security module 110 may be configured to monitor telemetry data (including changes in threat protection settings) generated by a threat protection application executing on one or more of client devices 202A-202C to determine if a threat recommendation 212 was followed by users in a particular threat cluster 118. For example, following threat recommendations 212 including suggested interventions to disable macros in a productivity application and to install a custom firewall application for client device 202C, security module 110 may detect that the suggested macros were not disabled but that the suggested custom firewall application was active.

At step 604 one or more of the systems described herein may determine an effectiveness of each of the implemented recommendations against potential malware threats. For example, security module 110 may, as part of server 206 in FIG. 2, determine the effectiveness of threat recommendations 212 implemented by users of client devices 202A-202C against potential malware threats.

Security module 110 may determine the effectiveness of threat recommendations 212 in a variety of ways. In some embodiments, security module 110 may utilize threat protection telemetry data generated by a threat protection application executing on one or more of client devices 202A-202C to determine whether a suggested intervention (e.g., a user recommendation to install a firewall application) in a threat recommendation 212 lowered a compromise percentage of users who acted on a threat recommendation 212 by a statistically significant amount.

At step 606 one or more of the systems described herein may rank each of the implemented recommendations based on the effectiveness against the potential malware threats. For example, security module 110 may, as part of server 206 in FIG. 2, rank threat recommendations 212 that have been implemented by users of one or more of client devices 202A-202C based on their effectiveness as determined at step 604.

Security module 110 may rank threat recommendations 212 in a variety of ways. In some examples, security module 110 may rank threat recommendations 212 by ordering threat recommendations 212 based on the effectiveness of their suggested interventions.

At step 608 one or more of the systems described herein may update a recommendations list to include only the highest ranked implemented recommendations. For example, security module 110 may, as part of server 206 in FIG. 2, update a list of threat recommendations 212 to include the most effective interventions (per threat cluster 118) based on the compromise percentage of users who acted on each threat recommendation 212 by a statistically significant amount. Following the aforementioned update, security module 110 may then continue a cycle of generating threat recommendations 212 (per threat cluster 118) by promoting the most statistically significant interventions to users of client devices 202A-202C.

As explained in connection with method 300 above, the systems and methods described herein provide for utilizing existing telemetry (e.g., installed software and visited websites) detected on multiple groups of computing devices to identify common threats associated with multiple users or customers and then group the customers into specific clusters based on customer types (e.g., suggested pre-defined profiles such as "gamer," "streamer," "developer," "IT professional," "productivity software user," etc.) and threat types (e.g., malicious document attachments and websites, phishing, ransomware, web browser vulnerabilities, etc.). By utilizing the aforementioned telemetry to group customers into clusters in this way, the systems and methods described herein may provide specific recommendations of implementable interventions (e.g., disabling macros, enabling optional operating system security settings, installing browser extensions for enhancing web browser security, installing custom firewall applications, increasing the sensitivity of ransomware detection, etc.), according to the most prevalent threats affecting each group, to customer computing devices for preventing potential malware attacks. Moreover, the systems and methods described herein may further utilize the telemetry to determine the effectiveness of each recommended intervention provided to the clusters over time so that the promotion of future recommendations may be "tuned" to only the most statistically significant interventions.

Figure 7:
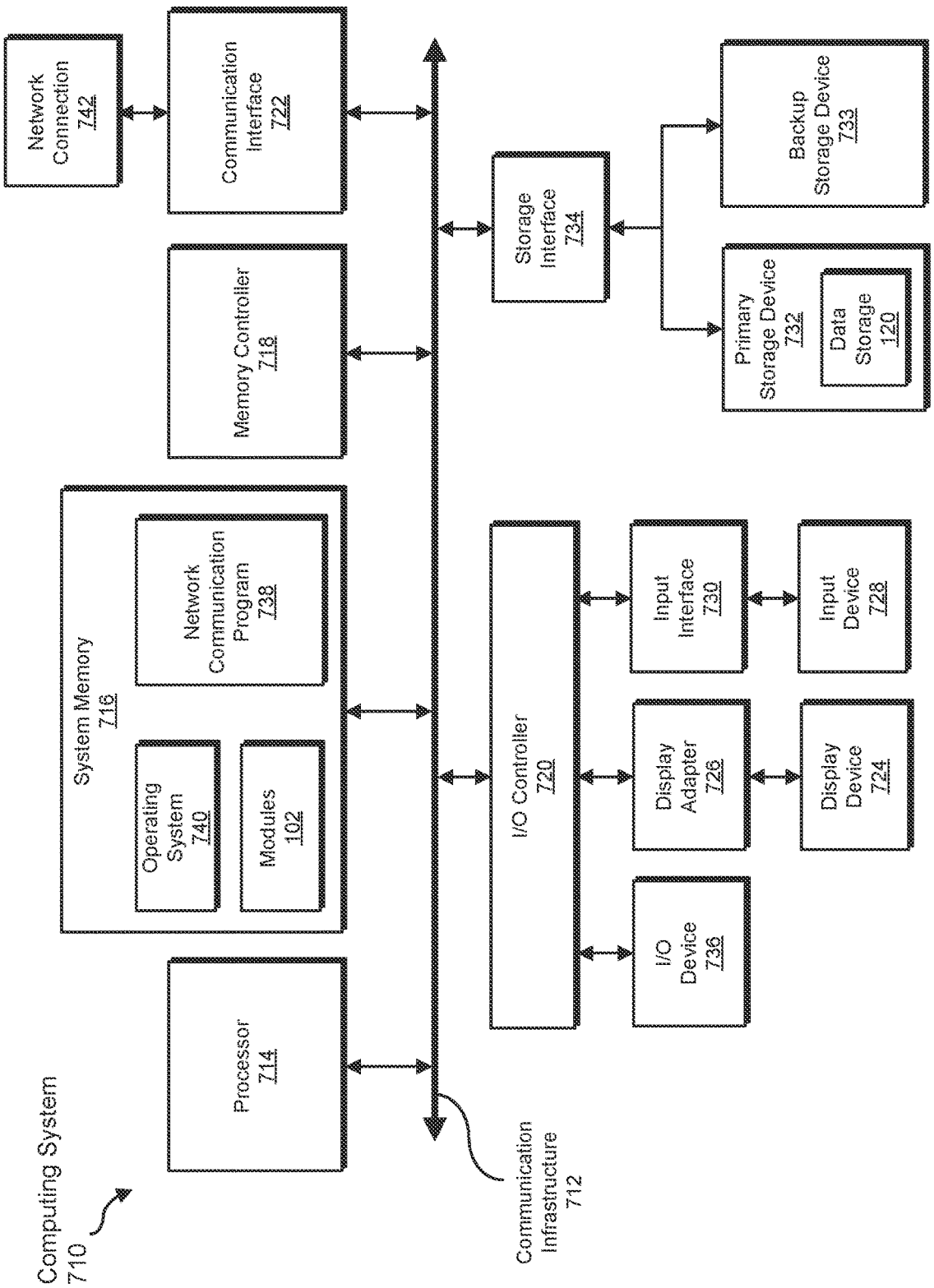
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data storage 120 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
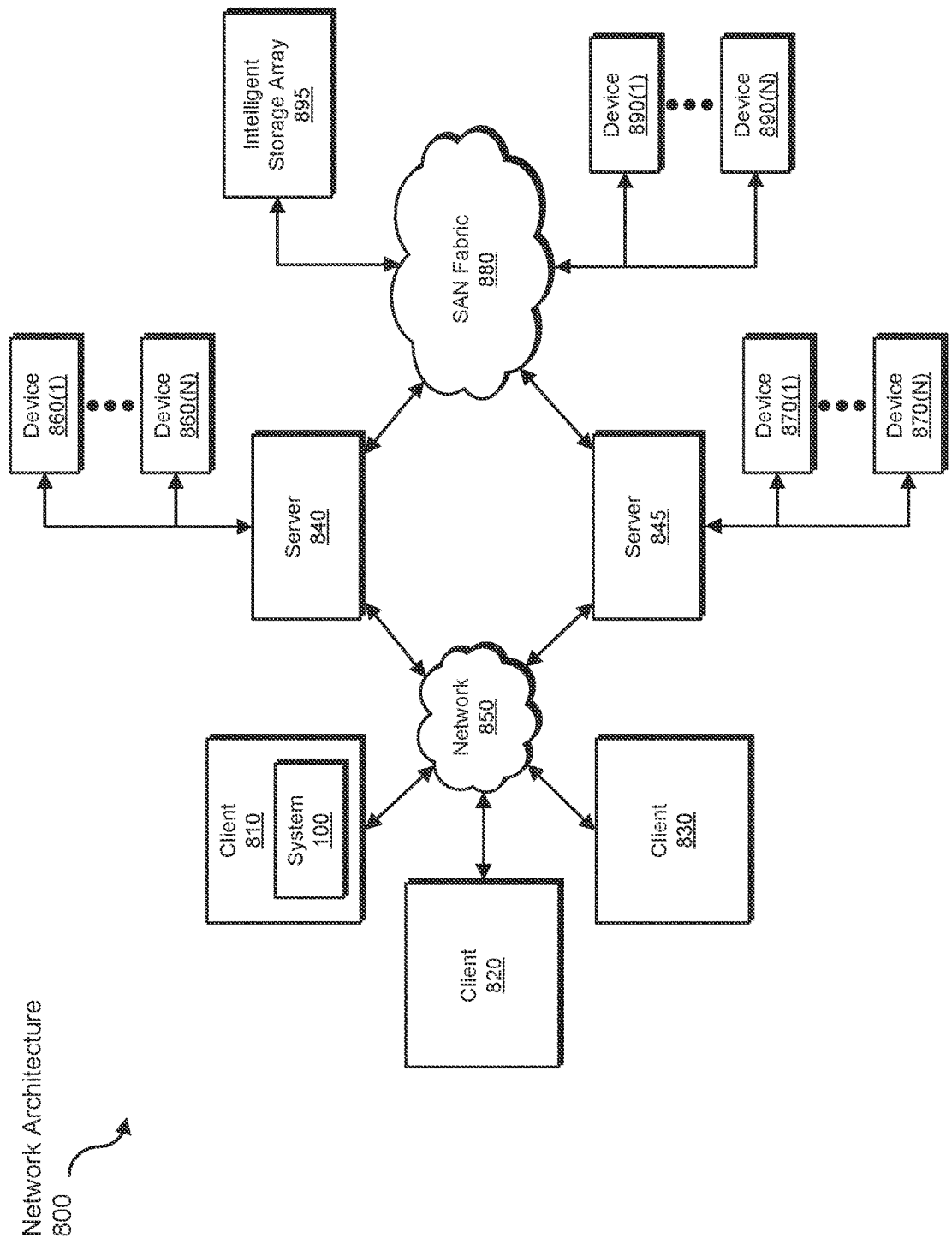
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for utilizing telemetry data to customize threat protection actions against potential malware threats.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing telemetry data to customize threat protection actions against potential malware threats, at least a portion of the method being performed by one or more computing devices comprising at least one processor, the method comprising:
   detecting, by the one or more computing devices, the telemetry data that indicates device usage on a plurality of client devices;
   determining, by the one or more computing devices, customer type data for the client devices by classifying the telemetry data into one or more predefined customer profiles;
   determining, by the one or more computing devices, threat type data for the client devices by identifying potential malware threats for the one or more predefined customer profiles based on the telemetry data;
   grouping, by the one or more computing devices, the client devices into one or more threat clusters based on the customer type data and the threat type data; and performing, by the one or more computing devices, a security action that protects at least one of the client devices against the identified potential malware threats associated with each of the threat clusters as grouped.

2. The computer-implemented method of claim 1, wherein performing the security action comprises providing one or more recommendations associated with each of the threat clusters to protect against the potential malware threats.

3. The computer-implemented method of claim 2, wherein providing the recommendations comprises updating programmatic settings in a threat protection application executing on the client devices.

4. The computer-implemented method of claim 2, wherein providing the recommendations comprises presenting one or more interventions associated with mitigating the potential malware threats for implementation by a user of the client devices.

5. The computer-implemented method of claim 2, wherein performing the security action further comprises:
monitoring the client devices to detect one or more implementations of the recommendations;
ranking each of the implemented recommendations based on a percentage of users that acted on the recommendation; and
updating a recommendations list to include only the highest ranked implemented recommendations.

6. The computer-implemented method of claim 5, wherein the highest ranked implemented recommendations comprises an intervention that is determined from threat protection telemetry data.

7. The computer-implemented method of claim 1, wherein the telemetry data comprises at least one of:
one or more applications installed on the client devices; and
one or more websites accessed from the client devices.

8. The computer-implemented method of claim 1, wherein determining the customer type data and the threat type data comprises:
identifying, based on the telemetry data, the one or more predefined customer profiles for each of a plurality of user groups associated with the client devices to determine the customer type data; and
assigning, based on the telemetry data, a malware threat classification for each of a plurality of client device groups within the client devices to determine the threat type data.

9. The computer-implemented method of claim 8, wherein identifying the predefined customer profiles comprises:
retrieving installation data describing installed applications from the client devices;
retrieving website data describing visited websites from the client devices; and
training a machine learning model, utilizing the installation data and the website data, to associate the client devices with cluster labels describing the predefined customer profiles for the plurality of user groups.

10. The computer-implemented method of claim 1, wherein grouping the client devices into the threat clusters comprises assigning the client devices to different subgroups based on one or more predominant potential malware threats associated with installed applications on the client devices and websites visited from the client devices.

11. A system for utilizing telemetry data to customize threat protection actions against potential malware threats, the system comprising:

at least one physical processor;
physical memory comprising computer-executable instructions and one or more modules that, when executed by the physical processor, cause the physical processor to:
detect, by a detection module, the telemetry data that indicates device usage on a plurality of client devices;
determine, by a determining module, customer type data for the client devices by classifying the telemetry data into one or more predefined customer profiles;
determine, by the determining module, threat type data for the client devices by identifying potential malware threats for the one or more predefined customer profiles based on the telemetry data;
group, by a cluster module, the client devices into one or more threat clusters based on the customer type data and the threat type data; and
perform, by a security module, a security action that protects at least one of the client devices against the identified potential malware threats associated with each of the threat clusters as grouped.

12. The system of claim 11, wherein the security module performs the security action by providing one or more recommendations associated with each of the threat clusters to protect against the potential malware threats.

13. The system of claim 12, wherein the recommendations are provided by updating programmatic settings in a threat protection application executing on the client devices.

14. The system of claim 12, wherein recommendations are provided by presenting one or more interventions associated with mitigating the potential malware threats for implementation by a user of the client devices.

15. The system of claim 12, wherein the security module further performs the security action by:
monitoring the client devices to detect one or more implementations of the recommendations;
ranking each of the implemented recommendations based on a percentage of users that acted on the recommendation; and
updating a recommendations list to include only the highest ranked implemented recommendations.

16. The system of claim 15, wherein the highest ranked implemented recommendations comprises an intervention that is determined from threat protection telemetry data.

17. The system of claim 11, wherein the telemetry data comprises at least one of:
one or more applications installed on the client devices; and
one or more websites accessed from the client devices.

18. The system of claim 11, wherein the determining module determines the customer type data and the threat type data by:
identifying, based on the telemetry data, the one or more predefined customer profiles for each of a plurality of user groups associated with the client devices to determine the customer type data; and
assigning, based on the telemetry data, a malware threat classification for each of a plurality of client device groups within the client devices to determine the threat type data.

19. The system of claim 18, wherein the predefined customer profiles are identified by:
retrieving installation data describing installed applications from the client devices;

retrieving website data describing visited websites from the client devices; and training a machine learning model, utilizing the installation data and the website data, to associate the client devices with cluster labels describing the predefined customer profiles for the plurality of user groups.

20. A non-transitory computer-readable medium comprising one or more computer-executable instructions that, when executed by at least one processor of a computing device, cause the computing device to:

detect telemetry data that indicates device usage on a plurality of client devices;

determine customer type data for the client devices by classifying the telemetry data into one or more predefined customer profiles;

determine threat type data for the client devices by identifying potential malware threats for the one or more predefined customer profiles based on the telemetry data;

group the client devices into one or more threat clusters based on the customer type data and the threat type data; and perform a security action that protects at least one of the client devices against the identified potential malware threats associated with each of the threat clusters as grouped.

* * * * *